United States Patent [19]
Gibson et al.

[11] Patent Number: 5,737,732
[45] Date of Patent: Apr. 7, 1998

[54] ENHANCED METATREE DATA STRUCTURE FOR STORAGE INDEXING AND RETRIEVAL OF INFORMATION

[75] Inventors: Seann A. Gibson; William K. Gibson, both of Columbus, Ohio

[73] Assignee: 1st Desk Systems, Inc., Medway, Mass.

[21] Appl. No.: 591,093

[22] Filed: Jan. 25, 1996

Related U.S. Application Data

[63] Continuation-in-part of Ser. No. 909,170, Jul. 6, 1992, Pat. No. 5,488,717.

[51] Int. Cl.[6] ........................................ G06F 17/30
[52] U.S. Cl. ........................ 707/2; 341/51; 707/3; 707/100
[58] Field of Search ........................ 395/601, 602, 395/603, 607, 611, 51

[56] References Cited

U.S. PATENT DOCUMENTS

| | | | |
|---|---|---|---|
| 4,464,650 | 8/1984 | Eastman et al. | 340/347 |
| 4,677,550 | 6/1987 | Ferguson | 364/300 |
| 5,153,591 | 10/1992 | Clark | 341/51 |
| 5,202,986 | 4/1993 | Nickel | 395/600 |
| 5,274,805 | 12/1993 | Ferguson et al. | 395/600 |
| 5,295,261 | 3/1994 | Simonetti | 395/600 |
| 5,412,384 | 5/1995 | Chang et al. | 341/79 |
| 5,488,717 | 1/1996 | Gibson et al. | 395/602 |
| 5,534,861 | 7/1996 | Chang et al. | 341/79 |
| 5,592,667 | 1/1997 | Bugajski | 395/613 |

OTHER PUBLICATIONS

T. Masui, *Keyword Dictionary Compression Using Efficient Trie Implementation*, 1991 Data Compression Conference 438 (IEEE Computer Society Press, 1991).

T.D.M. Purdin, *Compressing Tries for Storing Dictionaries*, Proceedings of the 1990 Symposium on Applied Computing 336-340 (IEEE Computer Society Press, 1990).

*Primary Examiner*—Paul R. Lintz
*Attorney, Agent, or Firm*—Morse, Altman & Benson

[57] ABSTRACT

Data storage space and access time are significantly decreased by use of an Enhanced MTree data structure, in which data is stored in the nodes of the tree. Two kinds of nodes—predecessor nodes and successor nodes—are coexisting in the data structure and are interrelated by a distribution of pointers. Both types of nodes may be further subdivided into packed nodes and alternate list nodes where the distribution of pointers includes next node pointers in the packed nodes and alternate node pointers in the alternate list nodes. The progressions of nodes are associated with progressions of items of coded data with each of the progressions of nodes associated with at least one identifier. The identifiers give the progression of nodes the ability to locate other progressions of nodes or the ability to be located by another progression of nodes or by an external object.

14 Claims, 8 Drawing Sheets

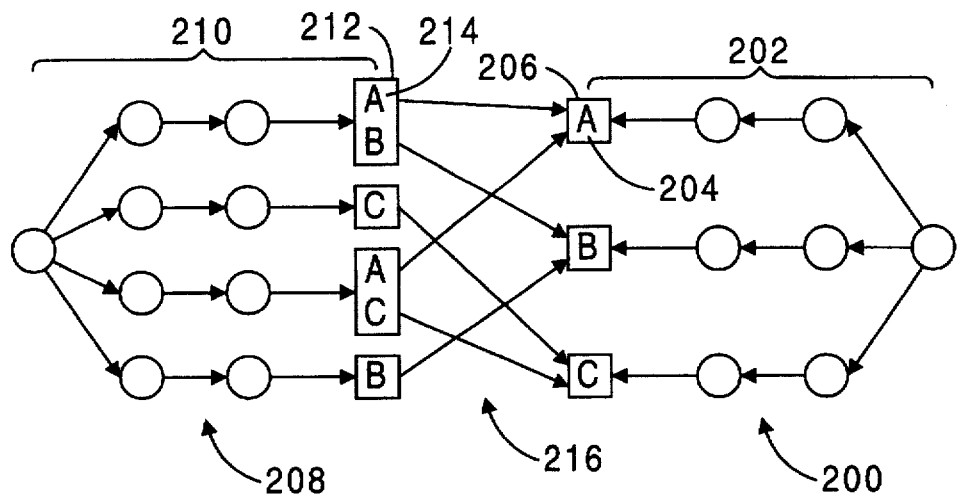
Fig. 3
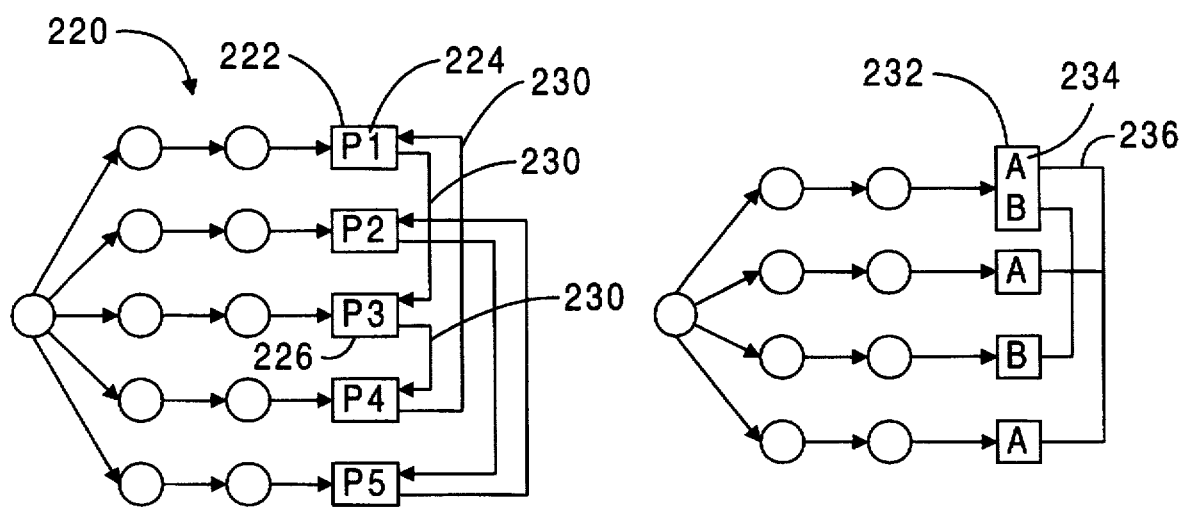
Fig. 4
Fig. 5

ENHANCED METATREE DATA STRUCTURE FOR STORAGE INDEXING AND RETRIEVAL OF INFORMATION

BACKGROUND OF THE INVENTION

1. Related Application

This application is a continuation-in-part of application Ser. No. 07/909,170 entitled MTREE DATA STRUCTURE FOR STORAGE, INDEXING, AND RETRIEVAL OF INFORMATION, filed on Jul. 6, 1992, now U.S. Pat. No. 5,488,717, in the names of Seann Gibson and Kerr Gibson.

2. Field of the Invention

The present invention relates to storing, indexing, and retrieving digital information and, more particularly, to tree configurations by which digital information is stored in a memory and accessed by a processor.

3. Prior Art

In many computer applications, large amounts of information must be stored and accessed. Generally, during the process of deciding how this information is to be stored, a tradeoff must be made between time and memory. The time variable includes the amount of time necessary to store information, to locate a particular piece of information, and to recreate the information once located. The memory variable includes the amount of memory necessary to store the information and to store and execute the software necessary to store, locate, and recreate the information.

There are actually two time/memory issues related to storing information, the first issue being how the information itself is stored in an information data base and the second issue being how a particular item of information is found within the information data base. The simplest way to store information is linearly, that is, information is stored in data memory as it is received and is not modified or compressed in any way. In such a system, a given amount of information occupies a proportional amount of data memory. The main advantage of such a system is that the amount of time needed store and retrieve the information is minimized. The main disadvantage is that data memory requirements grow in direct proportion to the amount of information stored.

An alternate method for storing information is to compress the information prior to storage so that at least some of the common elements are not duplicated. The resultant information data base is typically called a tree structure. This method is advantageous in that the amount of required data memory is minimized. However, the amount of time necessary to store and recreate the information is increased due to the fact that the information must be fed through one algorithm to be stored and another algorithm to be recreated. In addition, the memory required for the software needed to implement the algorithms is substantially greater than that for information stored linearly.

The simplest way to find a particular item of information is to linearly search the entire information data base for the item until it is found. This method is advantageous in that it is simple to implement, but the amount of time needed to find particular information is unpredictable in the extreme and the average time to find a particular piece of information can be unduly great.

An alternate method for finding information is to use a keyword data base, also called an index. The index is stored in memory separate from the information data base. Each keyword of the index points to one or more locations in the information data base that correspond to that keyword. Thus, rather than search a large information data base for particular items of data, a relatively small index is searched for keywords. The index can be stored linearly or as a tree structure, as described above.

The typical tree structure for storing information or keywords consists of a group of related nodes, each node containing a subset of the stored data, where the relationship between the nodes defines the information or keywords. Each unique item of information is stored as a set of linked nodes. The node containing the first part of the item is called the root node and is common to more than one item of information. The node containing the last part of the item is called the leaf node and is unique for each item of information. The way in which the nodes are related depends upon whether an information data base or an index is being implemented.

An index is used by searching from the root node for a known keyword. When the search reaches the leaf node for that keyword, a pointer or other identifier in the leaf node is used to locate the particular items of information associated with the keyword in the information data base.

The information data base, on the other hand, is designed to store and recover particular items of information. The pointer in the index leaf node points to a leaf node within the information data base. From that leaf node, previous node pointers in each node are used to trace back through the information data base to the root node, creating a list of nodes, data from which are used to sequentially recreate the item of information.

Because the configuration of the trees necessary for storing information and indexes are different, they are typically implemented using different node structures. Using different node structures precludes the use of common algorithms for modifying both information data bases and indexes. Different algorithms require different software for implementation, needing more memory for storage and execution, and creating the potential for more software errors.

Thus, there continues to be a need for a data structure for both information data bases and indexes that provides for heavy concentration of data, rapid and predictable information location and recreation times, and that is common to both information and indexes.

SUMMARY OF THE INVENTION

An object of the present invention is to provide a tree structure that is common to both an information data base and an index.

Another object of the present invention is to provide a tree structure that is easily adaptable to a variety of information data base configurations.

Another object of the present invention is to provide a tree structure wherein information and keywords are heavily concentrated in computer memory and rapidly accessible.

More particularly, the present invention contemplates a digital computation system that includes a processor means and memory means for executing digital programs and memory means for storing information and/or indexes upon which the digital programs act. The system includes coded instructions and coded data elements as follows. The processor establishes, in the memory, a tree of nodes that are interrelated by a particular distribution of pointers. The tree includes successor nodes and predecessor nodes. The pointers allow each node to find its successor and predecessor nodes.

The digital computation system comprises an architecture including a central processing unit, a memory, and input/output devices, such as a keyboard, mouse, display, and printer. Residing within the memory is the operating system, user applications including the software implementing the present invention, and the data stored in the way prescribed by the present invention.

For convenience, a tree embodying the present invention is referred to as an enhanced metatree or EMTree. An EMTree according to the present invention is used to store data in such a way that the storage and manipulation of the data become extremely practical and efficient. This structure has the following major advantages over standard data storage techniques: (1) a constant search time; (2) a constant sort time; (3) automatic data encryption; (4) non-duplication of redundant prefix data elements; (5) slow memory growth for massive amounts of data; and (6) extremely fast relational functionality between two or more EMTrees.

There are two types of nodes used in an EMTree, an alternate list node, or alt node, and a packed node. The alt node has four basic members: (1) the previous node pointer, (2) the previous unit, (3) the alternate list size, and (4) at least one alternate. The alternate list size contains the number of alternate EMTree branches available from this node. The alternate contains one of the alternatives that can be traced from this node. The alternate is composed of two submembers, the alternate unit and the alternate node pointer. The packed node has five basic members: (1) the previous node pointer, (2) the previous unit, (3) the element size, (4) the element, and (5) the next node pointer.

Any node that contains the last unit of a data item is called a terminal node. When a terminal node is a packed node or an alt node where each alternate contains the last unit of its corresponding data item, it is also a leaf node. Conversely, an alt node where at least one alternate does not contain the last unit of its corresponding data item is not a leaf. An alt node alternate that contains the last unit of its corresponding data item is a terminal alternate.

The next node pointer of a nonterminal packed node and the alternate node pointer of a nonterminal alternate contain a pointer to the next node in the sequence of nodes containing the elements of the data item. The next node pointer of a terminal packed node and the alternate node pointer of a terminal alternate contain one of the following: (1) a pointer to another terminal node in the EMTree, (2) a pointer to a terminal node in another EMTree, (3) a pointer to an external object, or (4) a data item identifier.

Items of data are added to an EMTree by first finding as much of the data item that already exists in the EMTree and then adding the remainder of the new data item. If the first nonmatching unit is in an alt node, a new alternate is added to that alt node and a new packed node is added for the remainder of the new data item. If the first nonmatching character is in a packed node, that packed node is split into zero, one, or two new packed nodes and a new alt node with two alternates consisting of the two nonmatching characters. A new packed node containing the remainder of the new data item is added.

The process of finding a data item in an EMTree includes traversing the EMTree from the root node, looking for matches between the units of the data item in sequence and possible consecutive nodes. The search continues until a nonmatch occurs, all the data item units are matched, or a leaf node is reached. If a nonmatch occurs or a leaf node is reached but not all the data item units have been matched, the data item is not in the EMTree. If a leaf node is reached and all the data item units are matched, the data item is found in the EMTree.

Deleting a data item from an EMTree begins with finding the data item terminal node. After the terminal node is found, all nodes tracing backwards from the terminal node are removed until an alt node with more than one alternate is reached. Then the alternate of the data item to delete is removed and the delete is complete.

Retrieving a data item begins with the terminal node. The nodes are traced backwards from the terminal node, buffering the data units, until the root node is reached. Because the data is retrieved in reverse order, after all the data units are retrieved, they are reversed.

Any alt nodes that are changed in size by adding or removing an alternate or any packed nodes that are decreased in size by splitting may be relocated to a node that uses the appropriate amount of memory for that size node. This ability provides for more efficient memory usage.

BRIEF DESCRIPTION OF THE DRAWINGS

For a fuller understanding of the nature and objects of the present invention, reference is made to the following specification which is to be taken in connection with the accompanying drawings wherein:

FIG. 3 shows a diagram of an information data base/index combination;

FIG. 4 shows a diagram of one configuration of a single tree information data base;

FIG. 5 shows a diagram of another configuration of a single tree information data base;

DETAILED DESCRIPTION OF THE PREFERRED EMBODIMENT

Figure 1:
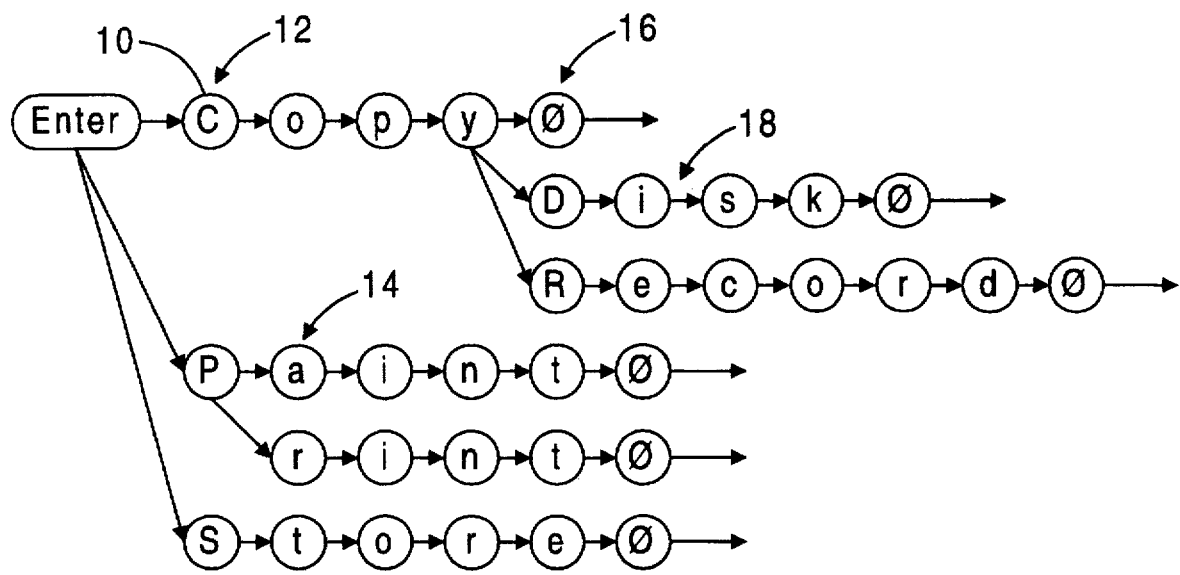
FIG. 1 shows a diagram of a typical data storage tree.
Figure 2:
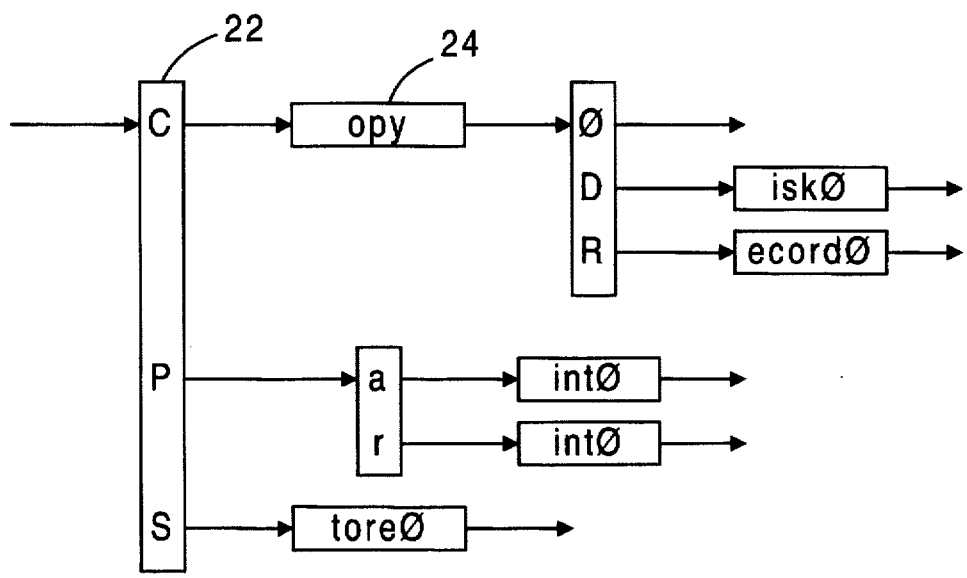
FIG. 2 shows a diagram of the data storage tree of FIG. 1 optimized according to the present invention.

Data Base Tree Structure—FIGS. 1 and 2

As an initial matter, this description of the present invention refers to a complete unique part of the information being stored as a data item, to a portion of the data item as an element, and to the smallest possible portion of a data item as a unit. In the typical information data base, the data will take the form of strings of characters, so that a data item is a string such as a sentence terminated by a NULL character (∅), an element is a substring (which can also be a single character), and a unit is a character. It is to be understood, however, that strings of characters are merely illustrative of a broad range of other data formats. Such other data formats, for example, include binary numbers as well as single bits.

As previously discussed, data in a tree structure is stored so that successive duplicate elements are not duplicated in memory. For example, a simple tree containing the six data items CopyØ, CopyDiskØ, CopyRecordØ, PaintØ, PrintØ, and StoreØ is shown in FIG. 1. In the typical prior art tree structure, each of the smallest possible elements of the data items are characters that are stored in separate nodes 10. Note that where the elements are no longer common to at least one data item, such as the vertical element groups 'C'—'P'—'S' 12, 'a'—'r' 14, and 'Ø'—'D'—'R' 16, a list of alternatives for the next unit is established and a selection must be made from this list as to which path to take. Also note that some elements, such as the 'i' in CopyDiskØ 18 are followed by only one element rather than a list of alternatives. These two characteristics of the tree permit the data items to be stored in the compressed tree shown in FIG. 2. Instead of 34 separate nodes of one type, each containing one unit, there are only 9 separate nodes of two types, each containing elements of multiple units. The first type of node 22 contains a list of alternative units and the other type of node 24 contains a group of successive common units.

Data Base Organizations—FIGS. 3 to 7

This section describes the environment in which the present invention is used. Data is stored in data bases, of which there are a variety of organizations. The present invention is a structure by which data is stored within these various data organizations. Data organizations include, but not limited to, (1) an information data base/index combination, (2) a single tree information data base, and (3) a multiple tree information data base.

In the information data base/index combination organization, shown in FIG. 3, each unique data item 202 in the information data base 200 typically has a unique identifier 204 associated with it stored in its leaf node 206. The leaf node 212 of each keyword 210 in the index 208 contains one or more identifiers 214, where each identifier 214 corresponds to a data item 202 in the information data base 200 that is associated with the keyword 210. To find particular items of information 202, the index 208 is searched for keywords 210 and the identifiers 214 in the keyword leaf nodes 212 are used to locate the data items 202 in the information data base 200, as at 216.

In the single tree information data base, shown in FIGS. 4 and 5, a pointer 224 in the leaf node 222 points to another leaf node 226 in the same tree 220. The pointers form a ring, as at 230, so that the ring eventually returns to the starting leaf node. An example of such an organization is the data base for a thesaurus. To find the synonyms for a particular word, the data base is searched for that word. The leaf node of that word contains a pointer to the leaf node of a synonym. The leaf node of that synonym, in turn, contains a pointer to another synonym. This pointer chain continues until a pointer to the original word is reached. Thus, a ring of pointers corresponds to a particular group of synonyms and finding any one of the words of the group allows all of the other words of the group to be located.

As an alternative, shown in FIG. 5, rather than containing a ring of pointers, the leaf node 232 contains at least one identifier 234, corresponding to a group of synonyms, as at 236. All leaf nodes 232 are searched for that particular identifier 234 to recover all the synonyms of the group. This alternative organization is more flexible because, to continue the thesaurus example, each word can now be a member of more than one group. However, this flexibility comes at the price of having to check every leaf node for the identifier, which is more time-consuming than following a pointer chain.

Figure 6:
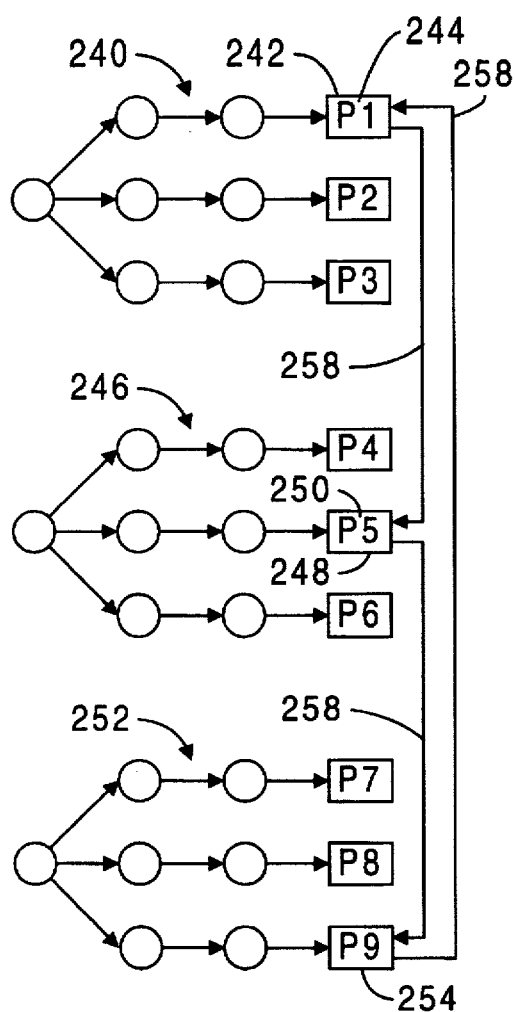
FIG. 6 shows a diagram of one configuration of a multiple tree information data base.
Figure 7:
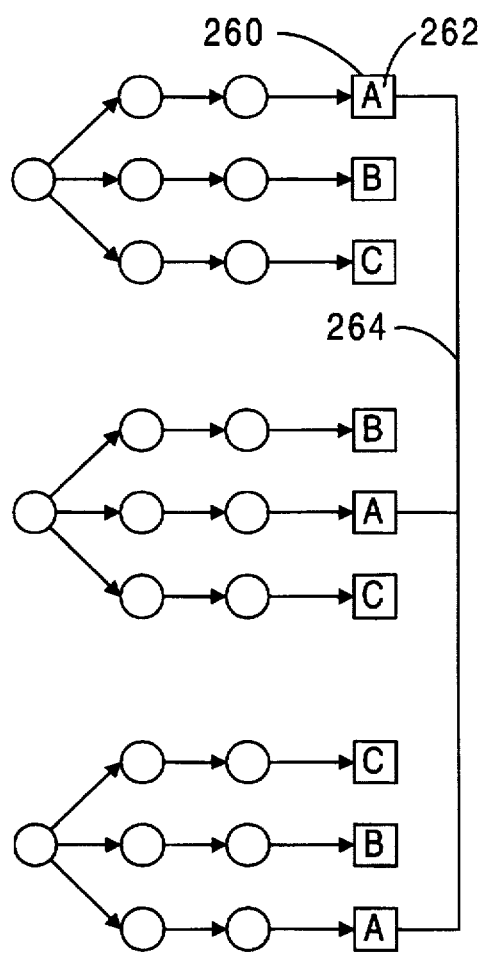
FIG. 7 shows a diagram of another configuration of a multiple tree information data base.

In a multiple tree information data base, shown in FIGS. 6 and 7, there are a plurality of trees, each corresponding to, for instance, one field of a record. For example, a data base consisting of names, addresses, and telephone numbers of people would have three separate trees, one for each of the person's name, address, and telephone number. In the organization of FIG. 6, the trees 240, 246, 252 are related to each other in a manner similar to that described above with respect to FIG. 4. Each leaf node 242 has a pointer 244 to the leaf node 248 corresponding to the same record in the next tree 246 that represents the next field of the record. The second leaf node 248, in turn, has a pointer 250 to the appropriate leaf node 254 in the next tree of the record sequence 252. This pointer chain continues until a pointer to the original leaf node 242 is reached. Thus, a ring of pointers, as at 258, corresponds to a particular record, and finding any one of the fields of the record allows all of the other fields of the record to be found. In the above example, the leaf node for the person's name points to the leaf node for the address, the leaf node for the address points to the leaf node for the telephone number, and the leaf node for the telephone number points to the leaf node for the person's name.

As an alternative, shown in FIG. 7, rather than containing a ring of pointers, the leaf node 260 contains at least one identifier 262, corresponding to a particular record, as at 264. All leaf nodes of each tree 260 are searched for that particular identifier 262 to recover all the fields of the record. As with the tree of FIG. 5, this alternative organization is more flexible because it permits multiple fields in each tree to be found. However, this flexibility comes at the price of having to check every leaf node for the identifier, which is more time-consuming than following a pointer chain.

Figure 8:
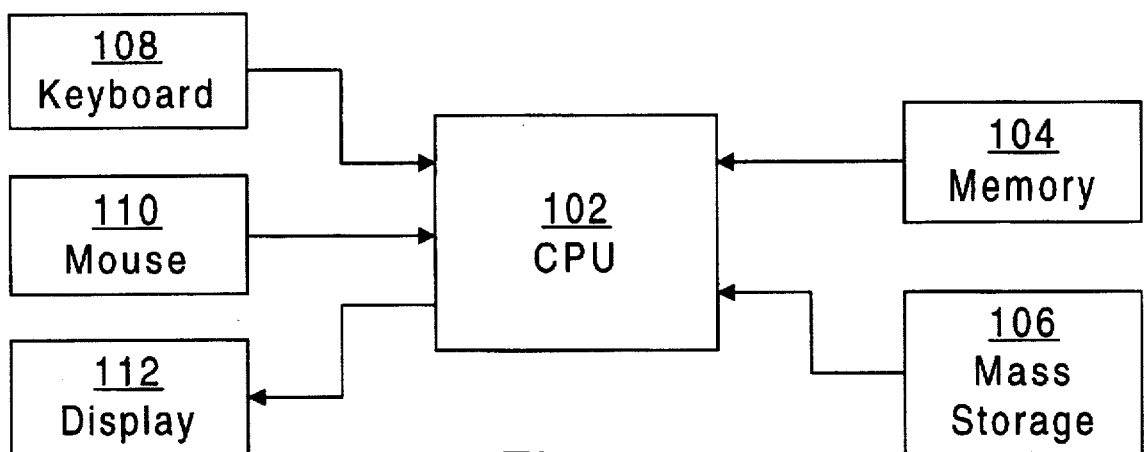
FIG. 8 is a block diagram of the hardware of a digital data processing system incorporating a preferred embodiment of the present invention.
Figure 9:
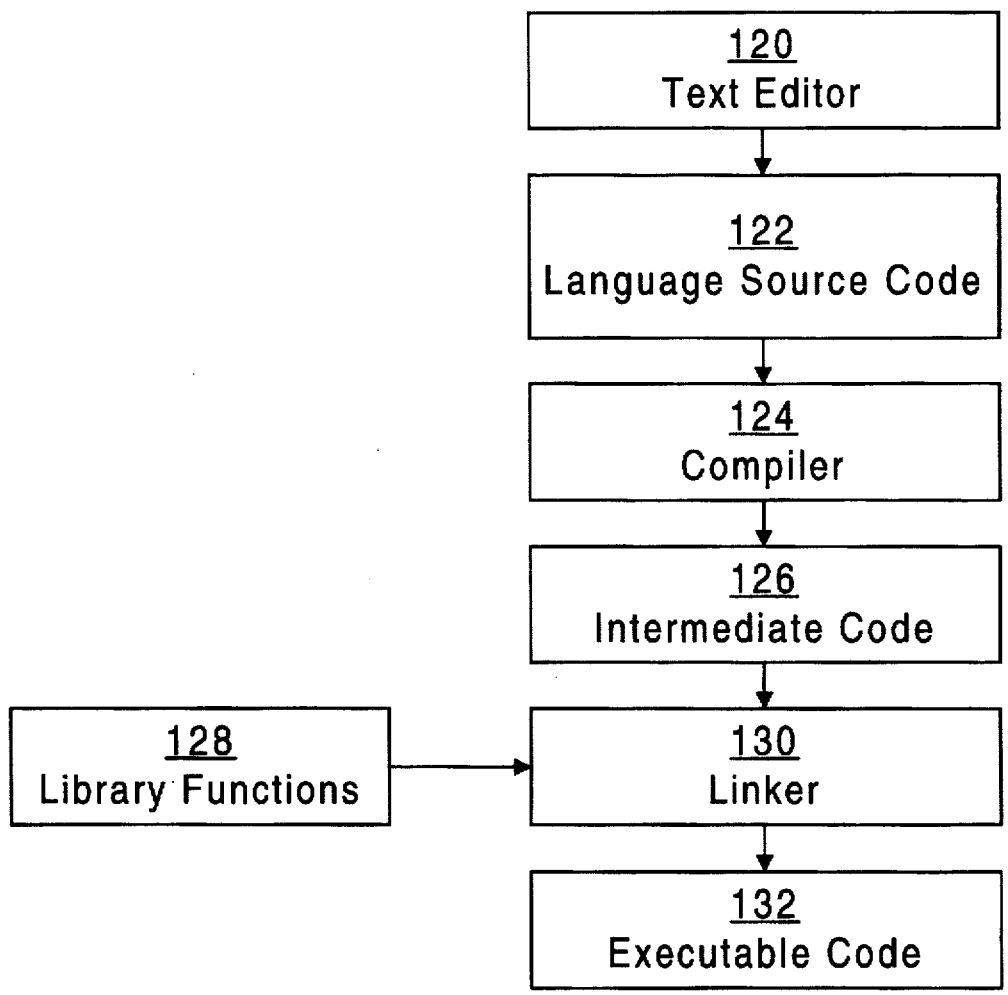
FIG. 9 is a block diagram of the software of a digital data processing system incorporating a preferred embodiment of the present invention.

Computer Configuration—FIGS. 8 and 9

The graphic illustrations and pseudocode described below are implemented in a digital computation system as shown in FIG. 8. This system comprises an architecture including a central processing unit (CPU) 102, memory 104, mass storage 106, and input/output devices, including a keyboard 108, a mouse 110, and a display 112. Residing within the memory 104 as CPU-executable code is the operating system and user applications, as in FIG. 9. In the illustrated system, executable code 132 is generated from two inputs. The first input is the source code 122 written in the language chosen by the programmer and generated using a text editor 120. The source code 122 is processed by a compiler 124 into an intermediate code 126. The second input is a library of standard functions 128 that has previously been compiled. The intermediate code 126 and the library functions 128 are processed together by a linker 130 into machine-readable code 132, executable by the CPU 102, and stored in memory 104.

It is to be understood that the principles of the present invention are applicable to all digital computation systems. For example, the type of CPU 102 is not limited to a particular family of microprocessors, but can be chosen from any group of suitable processors. This is also true of the memory 104, mass storage 106, and input/output devices 108, 110, 112. Likewise, the programmer may choose from a variety of programming languages, such as C, Pascal, BASIC, and FORTRAN, the appropriate compiler, linker, and libraries.

Figure 10:
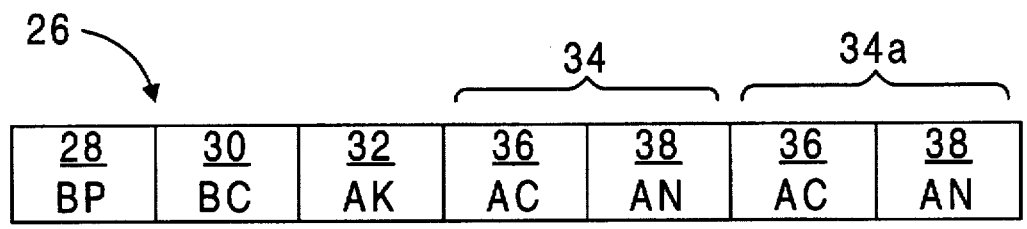
FIG. 10 is a diagram of an alt node.
Figure 11:
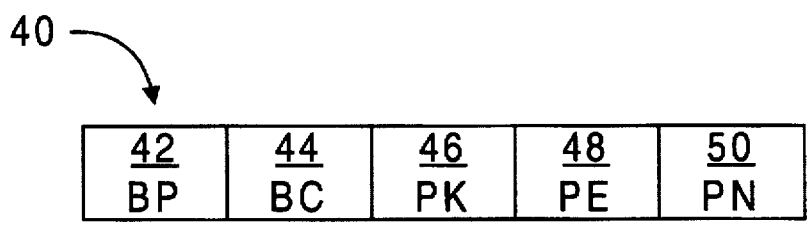
FIG. 11 is a diagram of a packed node.

EMTree Nodes—FIGS. 10 and 11

The essence of the enhanced metatree (EMTree) is its data storage structure, which is significantly different from any other previously implemented data storage structure. While the typical tree structure is based on a single node structure, the EMTree structure of the present invention is based on two optimized node structures that contain successive parts of the items of data to be stored. The EMTree structure is used easily in information storage and retrieval applications, as both the information data base structure and the index structure.

The EMTree of the present invention is based on the two types of nodes previously described with reference to FIG. 2. The node containing a list of alternative units 22 is called an alternate list node or alt node 26 and a node containing successive common units 24 is called a packed node 40.

The alt nodes 26 and packed nodes 40 of an EMTree are interrelated by a distribution of pointers. Every node, with the exception of the root node and the leaf nodes, has a predecessor node and at least one successor node. Pointers within each node facilitate the location of these predecessor and successor nodes, as described below.

The alt node 26, shown in FIG. 10, has four basic members: (1) the previous node pointer (BP) 28, (2) the previous unit (BC) 30, (3) the alternate list size (AK) 32, and (4) at least one alternate 34. If the node 26 is not a root node, the previous node pointer 28 contains the location in memory where the node preceding this node in the ordering of elements for a data item, the predecessor node, can be found. The previous unit 30 contains the previous unit associated with the same data item stored in that previous node. If the previous node is a packed node 40, the previous unit 30 contains the last unit of the element 48 of that node, as described below. If the previous node is an alt node 26, the previous unit 30 contains one of the alternate units 36, as described below, of that node. These two members 28, 30 facilitate the retrieval of the information stored, as described below.

The alternate list size 32 contains the number of alternatives available from this alt node 26. The alternate 34 contains one of the alternatives that follows this node 26, and the number of alternates 34 dictates the value of the alternate list size 32. FIG. 10 shows a second alternate 34a in phantom. The alternate 34 is composed of two submembers, the alternate unit (AC) 36 and the alternate node pointer (AN) 38. The alternate unit 36 contains the unit that sequentially follows the unit contained in the previous unit member 30 for a particular data item. If any of the alternate units 36 contain the last unit of a data item, the node is a terminal node. If all of the alternate units 36 contain the last unit of a data item, the node is also a leaf node. Any alternate 34 having an alternate unit 36 that contains the last unit of a data item is a terminal alternate.

When the alternate 34 is not a terminal alternate, the alternate node pointer 38 contains a pointer to the next node, or successor node, in the sequence of elements representing the data item that includes the unit contained in the alternate unit submember 36. When the alternate 34 is a terminal alternate, the alternate node pointer 38 contains one of the following: (1) a pointer to another terminal node in the EMTree, (2) a pointer to a terminal node in another EMTree, (3) a pointer to an external object, or (4) a data item identifier. Which of these values is contained in the alternate node pointer 38 depends on the configuration of the data base into which the alt node structure 26 is incorporated.

The packed node 40, shown in FIG. 11, has five basic members: (1) the previous node pointer (BP) 42, (2) the previous unit (BC) 44, (3) the element size (PK) 46, (4) the element (PE) 48, and (5) the next node pointer (PN) 50. If the node 40 is not a root node, the previous node pointer 42 contains the location in memory where the predecessor node can be found. The previous unit 44 contains the previous unit associated with the same data item stored in that previous node. If the previous node is a packed node 40, the previous unit 44 contains the last unit in the element 48 of that node, as described below. If the previous node is an alt node 26, the previous unit 30 contains one of the alternate units 36 of that node. These two members 42, 44 facilitate the retrieval of the information stored, as described below.

The element size 46 contains the size, in units, of the element contained in this node 40 and the element 48 contains the element data itself. If the last unit of the element 48 is the last unit of a data item, the node is a terminal node and a leaf node.

When the node 40 is not a terminal node, the next node pointer 50 contains a pointer to the successor node. When the node 40 is a terminal node, the next node pointer 50 contains one of the following: (1) a pointer to another terminal node in the EMTree, (2) a pointer to a terminal node in another EMTree, (3) a pointer to an external object, or (4) a data item identifier. Which of these values is contained in the next node pointer 50 depends on the configuration of the data base into which the packed node structure 40 is incorporated.

Adding a Data item to an EMTree—FIGS. 12 to 16

FIGS. 12 to 16 graphically illustrate how an EMTree is created, by beginning with the data item 'CopyDiskØ', and sequentially adding the five data items 'CopyØ', 'StoreØ', 'CopyRecordØ', 'PrintØ', and 'PaintØ'. In this example, the unit size is one character.

Figure 12:
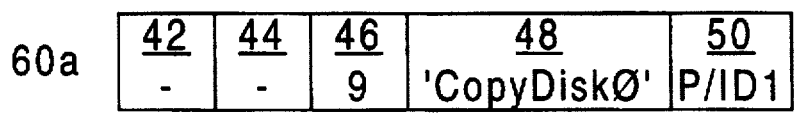
FIGS. 12 to 16 are diagrams showing a sequence for creating an EMTree of the present invention.

To begin the EMTree, a packed node 60a containing the element 'CopyDiskØ' is stored in memory, as shown in FIG. 12. Note that, because this node 60a is a root node, there is no previous node pointer 42 or previous unit 44. Also note that, because this node 60a is a terminal node, the next node pointer 50 (P/ID1) actually contains a pointer to another terminal node or external object or it contains a data item identifier. The length of the element is 9 characters, so the element size 46 contains the value 9 and the element 48 contains the element 'CopyDiskØ'.

Figure 13:
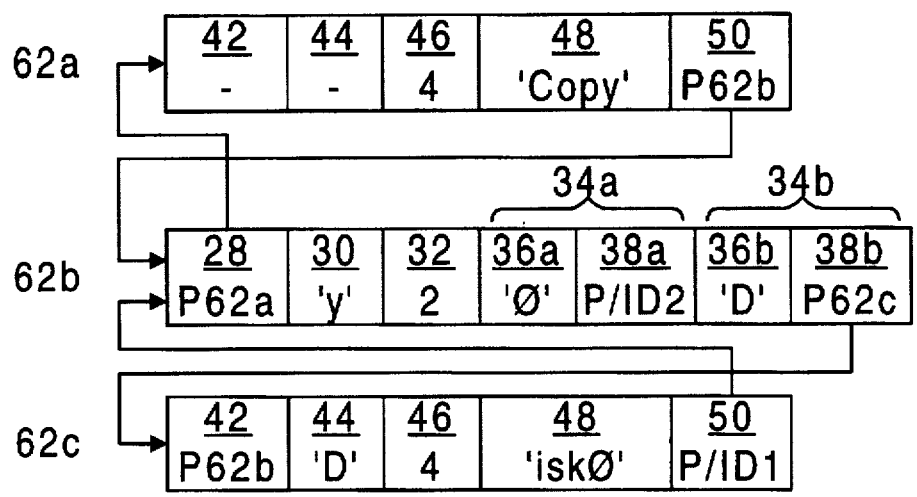

As shown in FIG. 13, the new data item 'CopyØ' is stored in the EMTree by first comparing each character of the existing node element 60a48 to the new data item in sequence until there is no longer a match. Only the first four characters, 'Copy', of the existing node element 62a48 match the new data item. As a result, node 62a is shortened to a length of 4 and the element 62a48 is changed to 'Copy'. A new node 62b is added to the EMTree, and the next node pointer of the first node 62a50 is set to point to the new node 62b. This new node 62b is an alt node containing two alternates, one each for the units 'Ø' 62b34a and 'D' 62b34b. Because there are two alternates 62b34a, 62b34b, the alternate list size 62b32 is set to 2. The previous node pointer 62b28 is set to point to the node 62a and the previous unit 62b30 is set to the unit 'y', which is the last character of the previous node's element 62a48.

The first alternate unit 62b36a is set to the character 'Ø' and, because it is the last unit of the data item, it is a terminal alternate and its alternate node pointer 62b38a is set to the pointer/data item identifier P/ID2. The second alternate unit 62b36b is set to the character 'D' and, because it is not the last unit of the data item, a new node 62c is added to the EMTree to complete the data item 'CopyDiskØ'. The node 62c is a packed node, where the previous node pointer 62c42 points to the previous alt node 62b, the previous unit 62c44 contains the character 'D', the element size 62c46 contains the value 4, the element 62c48 contains the characters 'iskØ', and the next node pointer 62c50 contains the P/ID1 that is copied from the original next node pointer 60a50.

It is to be noted that adding any new data item beginning with the characters 'Copy' allocates only a new alternate 34 in the node 62b for the fifth character and a new packed node for any additional characters. In other words, the existing 'Copy' node will be used for every data item in the EMTree containing 'Copy' as its first four characters. Hence the slow memory growth of the EMTree structure.

Figure 14:
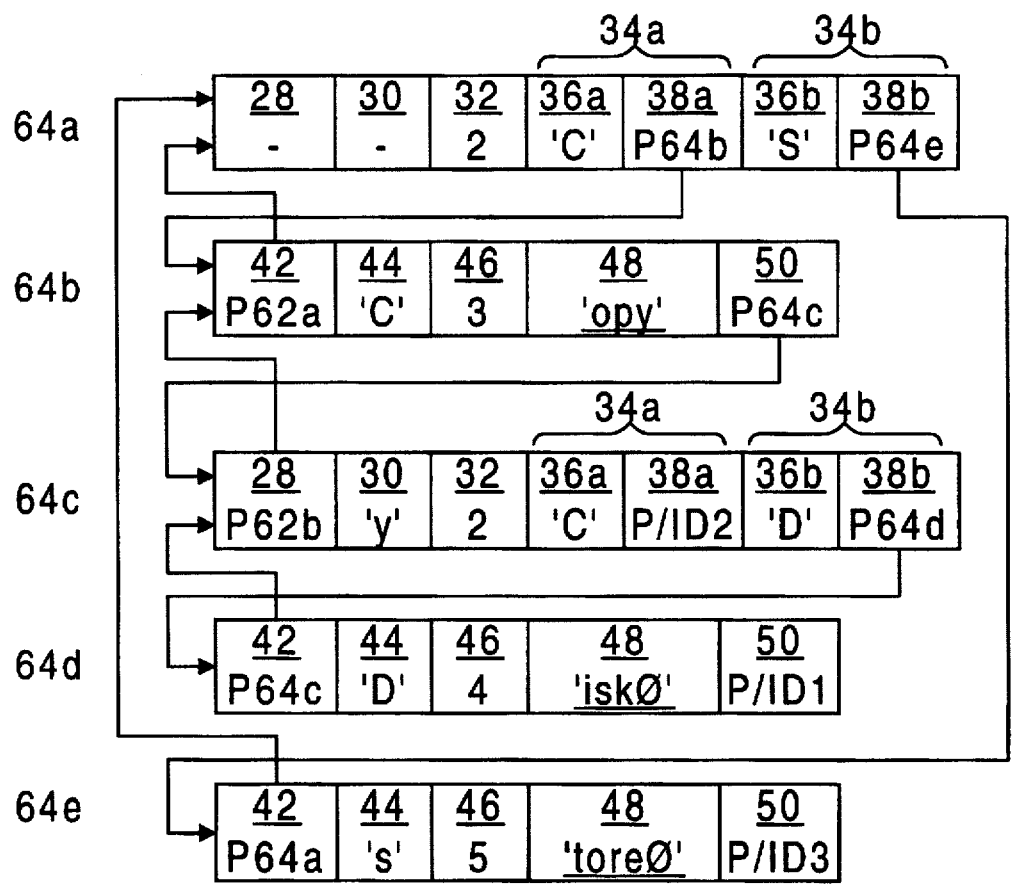

As shown in FIG. 14 the next data item 'Store∅' is stored in the EMTree by first comparing each character of the existing node element 62a48 to the new data item in sequence until there is no longer a match. Because the first character does not match, packed node 62a is replaced by an alt node 64a and a packed node 64b. The alt node 64a, which is also the new root node, has two alternates. The first alternate unit 64a36a contains the first character of the packed node 62a being replaced, namely 'C' and its alternate pointer 64a38a points to the replacement packed node 64b containing the remainder of the original node element 62a48, 'opy'. The second alternate unit 64a36b contains the first character of the new data item, namely 'S' and its alternate pointer 64a38b points to a new packed node 64e containing the remainder of the new data item, 'tore∅'. Original nodes 62b and 62c of FIG. 13 (64c and 64d in FIG. 14) are unaffected.

Figure 15:
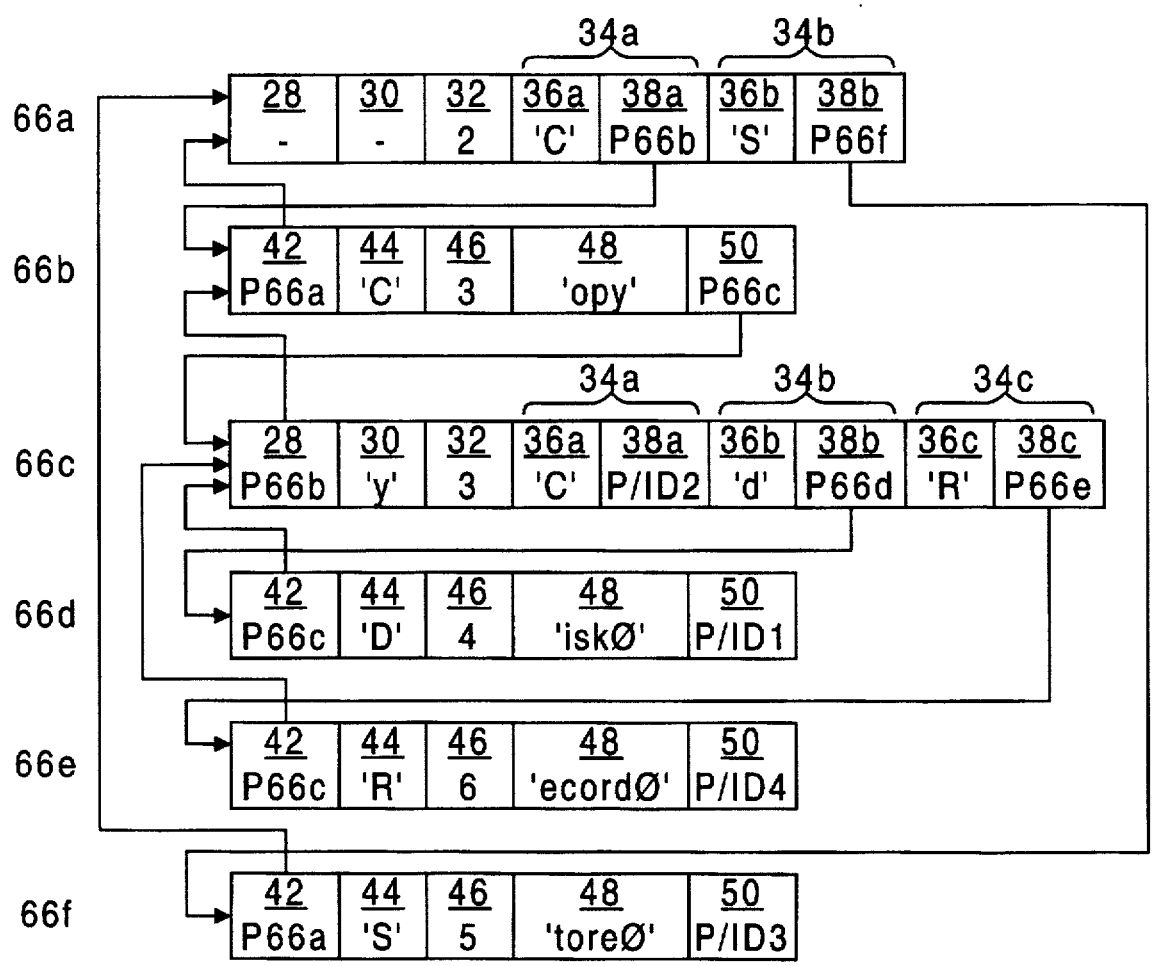

As shown in FIG. 15, the next data item 'CopyRecord∅' is stored in the EMTree by comparing the first character 'C' to the alternates 66a36a, 66a36b of the root node 66a. Because the first character matches one of the alternates 66a34a, the node pointed to by the alternate pointer 66a38a is compared. The comparison is between the element of the packed node 66648 and the characters of the new data item starting with the second character. All three characters of the packed node 66b match the next three characters of the new data item, so the next node pointer 66650 is taken to the next node 66c, an alt node. Each alternate unit 66c36a, 66c36b is compared to the next character of the new data item, 'R', and because it is not found among the alternates, a new alternate 66c34c containing the unit 'R' is added to the alternates and the number of alternates 66c32 is increased to 3. Since 'R' is not the last character of the new data item, a new packed node 66e containing the element 'ecord∅' is added to the EMTree to complete the addition of the new data item. The new alternate node pointer 66c38c is set to point to the new packed node 66e.

The next data item 'Print∅' is added in the same way as the data item 'Store∅', as described above, and the data item 'Paint∅' is added in the same way as the data item 'CopyRecord∅', as described above. The resultant EMTree is shown in FIG. 16.

Searching for a Data Item in an EMTree

To find a data item in the EMTree, one begins at the root node, which in the majority of cases, will be an alt node 26. The alternate units 36 are searched until the first unit of the data item is found. The search proceeds to the node pointed to by the alternate node pointer 38 associated with the found alternate unit 36. If the next node is a packed node 40, the search verifies that the element 48 matches the next set of units in the data item and the search continues with the node pointed to by the next node pointer 50. If the next node is an alt node 26, the alternates 34 are searched as previously described. The search continues until the entire data item is found. If, at any time, an element of the data item cannot be found in the node following the previous matching node or a leaf node is reached without matching all of the units of the data item, the data item does not exist in the EMTree. Depending on the purpose of the search, the data item may ignored, it may be added to the EMTree, as described above, the operator may be notified, etc.

Figure 16:
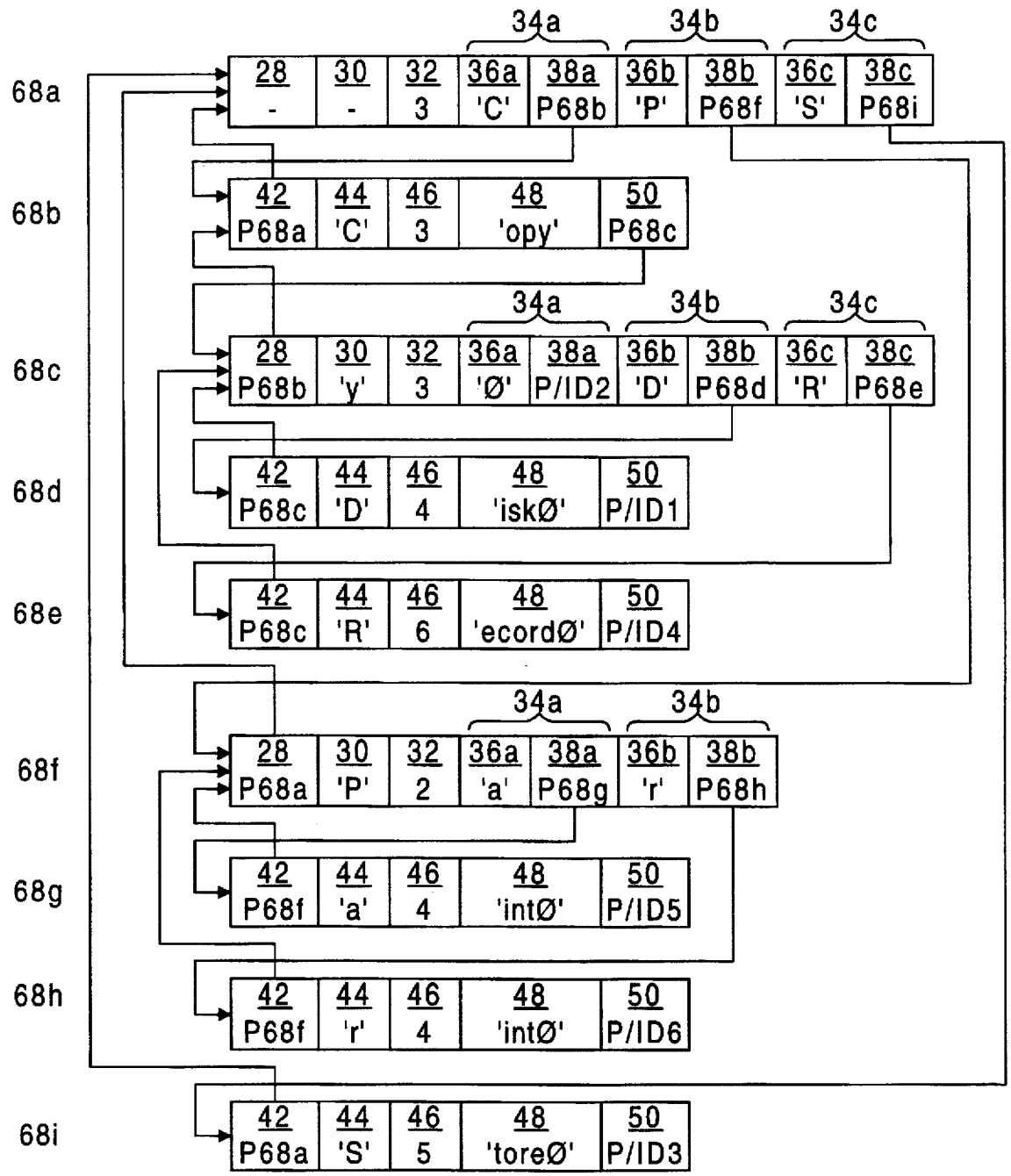

For example, a search for the data item 'CopyRecord∅' in the EMTree of FIG. 16 begins at the root node 68a. The alternate units 68a36 of that node's alternate list 68a34 are scanned until the character 'C', the first unit in the data item, is found. That character is found in alternate unit 68a36a. The search proceeds to the node pointed to by the alternate node pointer 68a38a associated with the 'C' unit, which is the packed node 68b. The search tests the next three characters of the data item, namely 'opy', and because the element of the packed node 68648 matches, the scan proceeds to the node pointed to by the next node pointer 68650. The next node is an alt node 68c. That node's alternate units 68c36 are scanned until the next character in the data item, 'R', is found. The alternate pointer 68c38c associated with the alternate unit 'R' 68c36c points to the packed node 68e, which contains the remainder of the data item, 'ecord∅', so the search ends. Note that the next node pointer 68e50 contains either a pointer to another terminal node, a pointer to external object, or an identifier (P/ID4).

Removing a Data Item from an EMTree

A data item is removed from the EMTree by searching for the data item. After the terminal node for the data item is found, all nodes tracing backwards are removed until an alt node 26 with more than one alternate 34 is reached. That corresponding alternate 34 is removed from the alt node 26. Any time an alternate 34 is removed, the alternate list size 32 is decremented by 1. If only one alternate 34 remains, the alt node 26 can be combined with the previous or next packed node 40, if one exists. Otherwise, the alt node 26 can be left alone or converted to a packed node 40 where the element has only one unit.

As an example, the data item 'Paint∅' is removed from the sample EMTree of FIG. 16. The EMTree is searched for the data item and found to exist in the node sequence 68a, 68f, and 68g. The first node removed is the terminal node 68g. One alternate 68f34a of its previous alt node 68f points to it, which is removed and the alternate list size 68f32 is decremented by one.

At this point the data item has been removed. However, the EMTree is no longer optimized because the alt node 68f now only has one alternate 66f34b, namely 'r'. This alt node 68f can be combined with the packed node 68h that follows it into one larger packed node containing the element 'rint∅' and then the alt node 68f can be removed. If this is done, the pointer 68a38b that points to old node 68f must be changed to point to the new combined packed node.

Retrieving a Data Item from an EMTree

A data item is retrieved by tracing the nodes of the EMTree backwards from the terminal node to the root node. First, the terminal node is found, such as by the identifier or pointer methods described above. If the terminal node is a packed node 40, the previous node pointer 42 is used to located the node prior to the terminal node in the sequence. If the terminal node is an alt node 26, the identifier or pointer method determines which alternate 34 contains the correct unit, and the previous node pointer 28 is used to locate the node prior to the terminal node in the sequence. The previous node pointer 28, 42 of the previous node is then used to locate the node prior to it. This process is followed until the root node is reached. As each previous node is found, the elements 48 from the packed nodes and the alternate units 44 from the alt nodes are saved in a buffer. After all of the units of the data item are retrieved, the buffer is reversed, because the units are retrieved in reverse order.

The Pseudocode of the Preferred Embodiment

Pseudocode is shown herein to illustrate code for performing functions and establishing relationships embodying the present invention. Pseudocode does not represent a particular programming language, but is similar to a flowchart in that it shows the sequence of instructions that perform a function. The pseudocode is designed to operate on strings of characters. In the majority of software implementations, a character string is a sequence of characters that end with a consistent terminating character, which is typically a NULL character. This allows the software to be written knowing that a character string will always end with the terminating character.

Node Definitions

The data structures for the alt node and the packed node are defined below. Most of the elements are as described above. There are several additional elements in this preferred implementation of the present invention. The element 'T' in both data structures describes the type of node, which is either an alt node or a packed node. The element 'R' in both data structures denotes whether or not the node is a root node. Specific to the alternate node structure, the element AT flags if that alternate is a terminal alternate. In a leaf node, all the AT elements will be TRUE. Specific to the packed node structure, the element PT flags whether or not the node is a terminal (leaf) node.

---

NODE DEFINITIONS let alternateNode define T, R, (BP, BC), AK, ((AC$_1$, AT$_1$, AN$_1$) ... (AC$_{ak}$, AT$_{ak}$, AN$_{ak}$))
// Where T is type: always "alternateType".
// Where R is root: one of TRUE or FALSE.
// Where BP is back pointer: a pointer to the previous node
// containing the BC.
// Where BC is back character: the previous character.
// Where AK is alternate count: the number of alternate
// characters in this node.
// Where AC is one alternate character.
// Where AT is one terminator: one of TRUE or FALSE - does
// this alternate terminate the data item this alternate
// is part of. If this is a leaf node, all the
// alternates must be terminators. But a terminal
// alternate may exist in a non-leaf node.
// Where AN is one next Ptr: a pointer to the next node or
// if this is a terminating alternate, AN is a user
// pointer or ID.
let packedNode define T, R, (BP, BC), PK, PT, PN, (PC$_1$ ... PC$_{pk}$))
// Where T is type: always "packedType".
// Where R is root: one of TRUE or FALSE.
// Where BP is back Pointer: a pointer to the previous node
// containing the BC.
// Where BC is back character: the previous character
// Where PK is packed count: the number of packed characters
// in this node.
// Where PT is terminator: one of TRUE or FALSE - does this
// packed list terminate the data item this packed node is
// a part of. If TRUE, this must be a leaf node.
// Where PN is next Ptr: a pointer to the next node or if
// this is a terminating packed node, PN is a user pointer
// or ID.
// Where PC is one packed character. PC$_1$ ... PC$_{pk}$ is also
// referred to as PE.

---

Free Nodes

The following discussion assumes that free nodes are available for use when needed. In the preferred embodiment, a plurality of free nodes are maintained in memory. The number of free alt nodes available is generally equal to the number of possible alternates, where each free alt node has a different number of available alternatives. The number of free packed nodes available is generally equal to the number possible characters in an element, where each free packed node has an element of a different size. A list is maintained that keeps track of the available free nodes and their locations.

When a node is replaced or deleted from the EMTree, it is added to the free node list. When a node is added to the EMTree, it is removed from the free node list. The function CREATE_NODE retrieves a free node for use in the EMTree.

Adding a String

The following pseudocode routines are used to add the string S of length j to an EMTree EMT. The main routine "AddString" begins by executing a match loop that finds as much of the string that already exists, starting with the first alternate or first packed character of the root node. Within the match loop, the routine looks for each character of the string in sequence in possible consecutive nodes. If the first character matches a node character, the next character of the EMTree is retrieved and compared to the next character of the new string. If the current node is a packed node and the current character is not the last character, the next character of the packed node is retrieved for comparison. If the current node is a packed node and the current character is the last character of the packed node or the current node is an alt node, the next node is retrieved using the next node pointer. The match loop continues until either a character of the new string does not match any possible next characters or a terminal node is reached.

If the match loop terminated because there are no more characters of the new string to match, the new string already exists in the EMTree.

If the match loop terminated because a terminal node was reached, this means that the new string is a continuation of an already existing string. Normally, this will not happen. If every string ends in the same terminating character, then a string cannot have another string as a subset. For example, the string "CopyØ" is not a subset of "CopyDiskØ" because of the 'Ø' terminating character. The loop would have ended when the 'Ø' of "CopyØ" did not match the 'D' of "CopyDiskØ". However, for the sake of completeness, this contingency is provided for. The terminal alternate is flagged as no longer the terminal alternate and a new packed node is added, containing the remainder of the new string. The alternate node pointer of the former terminal alternate points to the new packed string.

If the match loop terminated because the next character could not be found in an alt node, a new alternate is added to that alt node. If the new alternate is the last character of the new string, the alternate is flagged as a terminal alternate and the routine terminates. If the new alternate is not the last character of the new string, a packed node is added to the EMTree, which is pointed to by the next node pointer of the new alternate. The new packed node is also flagged as a terminal or leaf node.

If the match loop terminated because the next character could not be found in a packed node, the packed node is converted to zero, one, or two packed nodes and an alt node is inserted. The routine "splitPackedNode" provides this function. First an alt node of size 2 is created. The two alternates are the unmatched characters, one from the packed node and the other from the new string. If the unmatched character is the only character of the packed node, the new alt node replaces the original packed node. If the unmatched character is the first character of the packed node, a new packed node containing all the characters of the original packed node except the first character is created. The previous node pointer of the new alt node points to the previous node of the original packed node and the next node pointer of that previous node points to the new alt node. The next node pointer of the alternate taken from the original packed node points to the new packed node and the previous node pointer of the new packed node points to the new alternate node. The next node pointer of the new packed node points to the same node as the original packed node and that node's previous node pointer points to the new packed node.

If the unmatched character is the last character of the original packed node, a new packed node containing all the characters of the original packed node except the last character is created. The next node pointer of the previous node of the original packed node points to the new packed node and the previous node pointer of the new packed node points to the previous node of the original packed node. The next node pointer of the new packed node points to the new alt node and the previous node pointer of the new alt node points to the new packed node. The next node pointer of the alternate derived from the original packed node points to the node pointed to by the original packed node and that node's previous node pointer points to the new alt node.

If the unmatched character is neither the first nor last character of the packed node, two packed nodes and an alt node are created. The first packed node ("leftNode") contains all the characters of the original packed node up to but not including the unmatched character. The second packed node ("rightNode") contains all of the characters of the original packed node following the unmatched character.

After the original packed node is split into an alt node and zero, one or two packed nodes, a new packed node is created that contains all the characters of the new string following the unmatched character. The previous node pointer of this packed node points to the new alt node and the new alternate derived from the new string unmatched character points to this new packed node.

Any alt nodes that are increased in size by adding an alternate or any packed nodes that are decreased in size by splitting may be relocated in memory to a free node that is of the same size as the newly sized node. This ability provides for more efficient memory usage. If a node is relocated, its previous node must have its next node pointer updated and any subsequent nodes pointed to by the relocated node must have their previous node pointers updated. The routine "NodeMayHaveMoved" provides these functions.

---

ADDING A STRING - AddString

---

```
Addstring(EMT, S₁...Sⱼ, userDataPointer)
  // First we need to find as much of the string as already
  // exists in the EMTree. Loop as long as Sₙ matches the
  // next character and the node is not the terminator.
  // Get the root node for the EMTree EMT.
  node = GetRootNode(EMT)
  // Start with first alt or packed char of root node.
  i = 1
  // Start at S₁.
  n = 1
  loop while n < j AND FindAlternate(Sₙ, node, i) AND
              NOT IsTerminator(node, i)
    n = n + 1
    // If this is a packed node and i is not at the last
    // packed character then simply increment i.
    if node.T = packedType
      if i < node.PK
        i = i + 1
      // If this is a packed node and not a terminator
      // node then get the next node and start i at the
      // first character.
      else if node.PT = FALSE
        READ_NODE(EMT, node, node.PN)
        i = 1
      end if
    // If this is an alternate node, then read the node for
    // the ith alternate's next pointer. Set I to start at
    // the first alternate by default.
    else if node.ATᵢ = FALSE
      READ_NODE(EMT, node, node.ANᵢ)
      i = 1
```
    end if
  end loop
  // If there is no more string left (n = j) then the
  // string is already in the EMTree. Otherwise add the
  // rest (n < j).
  if n < j
    // Set isTerminator TRUE if n = j.
    isTerminator = (n = j)
    // Whether alternate or packed, if the current
    // characters of the string and node match, match loop
    // (above) ended because this is the terminator
    // character. This means the new string is a
    // continuation of an already existing string in the
    // EMTree.
    if FindAlternate(Sₙ, node, i)
      // Flag that node is no longer the terminator and
      // store it. NOTE: The next pointer for node will
      // be set later.
      if node.T = packedType
        node.PT = FALSE
      else
        node.ATᵢ = FALSE
      end if
      nodePointer = STORE_NODE(EMT, node)
      // Ended on an alternate node. Add the unmatched
      // character of the string to the alternate node and
      // then continue. NOTE: Make sure the size of the
      // node is sufficient to merely increment the node
      // count and add the new alternate. Also, probably
      // want to add the new alternate character in some
      // sorted order with the other alternates - the pseudo
      // code ignores this.
    Else if node.T = AlternateType
      node.AK = node.AK + 1
      x = node.AK
      node.ACₓ = C
      node.ATₓ = isTerminator
      if isTerminator
        node.ANₓ = userDataPointer
      else
        node.ANₓ = NULL
      endif
      nodePointer = STORE_NODE(EMT, node).
      NodeMayHaveMoved(EMT, node, nodePointer)
      // Ended in a packed node. Split the packed node up
      // into an alternate list of the two current non-
      // matching characters and packed lists of any previous
      // and next characters in node.
    else
      node, nodePointer, i = SplitPackedNode(EMT, Sₙ,
              isTerminator, node, i, userDataPointer)
    end if
    // If we did not just add the last character, add the
    // remainder of the string.
    if NOT isTerminator
      n = n + 1
      // Create a new packed node of j-n characters and
      // initialize the node data.
      newNode, newNodePointer = CREATE_NODE(packedType, j-n)
      newNode.BC = GetCurrentCharacter(node, i)
      newNode.BP = nodePointer
      newNode.PK = j-n
      newNode.PT = TRUE
      newNode.PN = userDataPointer
      m = 1
      loop while m <= j
        newNode.PCₘ = Sₘ
        m = m + 1
      end loop
      // Now update the node to point to the new one.
      if node.T = packedType
        node.PN = newNodePointer
      else
        node.ANᵢ = newNodePointer
      end if
      STORE_NODE(EMT, node)
    end if
  end if
end AddString

| FindAlternate |
| --- |
| // Does the given node contain R as an alternate.<br>FindAlternate (R, node, i)<br>  // A packed node has only one 'alternate' for each packed<br>  // character. Therefore, it contains R if the current<br>  // ith packed character equals R.<br>  if node.T = packedType<br>    return (node, i, node.PC$_i$ = R)<br>  // An alternate node contains R if one alternate in the<br>  // list is R. So loop through the alternates and return<br>  // TRUE if R is matched.<br>  else<br>    i = 1<br>    loop while i <= node.AK<br>      if (node.AC$_i$ = R)<br>        return (node, i, TRUE)<br>      end if<br>      i = i+1<br>    end loop<br>    return (node, i) // Don't return bad i, just return 1.<br>  end if<br>end FindAlternate |

| SplitPackedNode |
| --- |
| SplitPackedNode(EMT, C, isTerminator, node, i,<br>        userDataPointer)<br>  // First, create the alternate node. We know that we<br>  // must at least have this node. Set as much information<br>  // as we can right now. NOTE: For simplicity in this<br>  // pseudocode, do not sort the 2 characters put into the<br>  // new alternateNode.<br>  // alternateNode, alternateNodePointer =<br>        CREATE_NODE(alternateType, 2)<br>  alternateNode.AK = 2<br>  alternateNode.AC$_1$ = node.PC$_i$<br>  // AT$_1$ and AN$_1$ will be set later.<br>  alternateNode.AC$_2$ = C<br>  alternateNode.AT$_2$ = isTerminator<br>  if isTerminator<br>    alternateNode.AN$_2$ = userDataPointer<br>  else<br>    alternateNode.AN$_2$ = NULL // Will be set later<br>  end if<br>  // If i > 1, there is at least 1 character to the left of<br>  // the split position (i). So move those characters to a<br>  // leftNode, which is a packed node with i-1 characters.<br>  if i > 1<br>    leftNode, leftNodePointer = CREATE_NODE(packedType,i-1)<br>    leftNode.BC = node.BC<br>    leftNode.BP = node.BP<br>    leftNode.PK = i-1<br>    leftNode.PT = FALSE<br>    leftNode.PN = alternateNodePointer<br>    n = 1<br>    loop while n <= i-1<br>      leftNode.PC$_n$ = node.PC$_n$<br>      n = n + 1<br>    end loop<br>    // Store the node and call nodeMayHaveMoved because we<br>    // need to make sure that the previous node (backwards<br>    // pointer) will point to leftNode now.<br>    STORE_NODE(EMT, leftNode)<br>    nodeMayHaveMoved(EMT, leftNode, leftNodePointer)<br>    // Now we know some more information to be stored in<br>    // the alternate list.<br>    alternateNode.BC = leftNode.PC$_i$-1<br>    alternateNode.BP = leftNodePointer<br>    // No characters to the left, so the alternate's back<br>    // information is the same as the original node's. NOTE:<br>    // The backwards node will have to have its pointer<br>    // changed to the new alternate pointer. This will<br>    // happen when STORE_NODE is called for alternateNode<br>    // later.<br>  else<br>    alternateNode.BC = node.BC<br>    alternateNode.BP = node.BP<br>  end if<br>  // if i < node.PK, there are character to the right of |

| (continued) |
| --- |
| // the split position (i) so move those characters to a<br>  // rightNode, which is a packed node with node.PK-i<br>  // characters.<br>  if i < node.PK<br>    rightNode, rightNodePointer =<br>        CREATE_NODE (packedType, node.PK-i)<br>    rightNode.BC = getCurrentCharacter (node, i)<br>    rightNode.BP = alternateNodePointer<br>    rightNode.PK = node.PK - i<br>    rightNode.PT = node.PT<br>    rightNode.PN = node.PN<br>    n = i + 1<br>    loop while n <= node.PK<br>      rightNode.PC$_{n-i}$ = node.PC$_n$<br>      n = n+1<br>    end loop<br>    // Store the node and call nodeMayHaveMoved because we<br>    // need to make sure that the next node (next pointer)<br>    // will point to rightNode now.<br>    STORE_NODE(EMT, rightNode)<br>    NodeMayHaveMoved(EMT, rightNode, rightNodePointer)<br>    // Now we know some more information to be stored in<br>    // the alternate list.<br>    alternateNode.AT$_1$ = FALSE<br>    alternateNode.AN$_1$ = rightNodePointer<br>  // If there are no characters to the right of the split.<br>  else<br>    alternateNode.AT$_1$ = node.PT<br>    alternateNode.AN$_1$ = node.PN<br>  end if<br>  // Delete the initial packed node and restore the<br>  // alternateNode. Must call nodeMayHaveMoved to fix the<br>  // previous node's next pointer (if needed - if no left<br>  // characters). Return the new alternateNode. Also,<br>  // return 2 so that when rest of string is added, it will<br>  // continue from the second alternate (the<br>  // alternate added for the given string).<br>  DELETE_NODE(EMT, node)<br>  alternateNodePointer = STORE_NODE(EMT, alternateNode)<br>  NodeMayHaveMoved(EMT, alternateNode, alternateNodePointer)<br>  return (alternateNode, alternateNodePointer, 2)<br>end SplitPackedNode |

Finding a String

The following pseudocode routine is used to find a particular string within an EMTree, where the name of the EMTree is EMT, the string to find is S, and the string length is j. The routine starts with the root node of the EMTree. A loop is executed that looks for each character of the string in sequence in possible consecutive nodes. The loop continues as long as (1) the last character of the string has not been matched, (2) one of the next characters of the EMTree matches the next character of the string, and (3) a packed terminal node or terminal alternate has not been reached. When the loop terminates and, if the all the string characters have been matched and a packed terminal node or terminal alternate has been reached, the string is located. In such a case, the terminal node ("node"), the number of the alternate or the number of the last packed character ('i'), and a TRUE flag are returned to the calling routine. If any of the above conditions are not true, then the string does not exist in the EMTree and a FALSE flag is returned to the calling routine.

| FINDING A STRING - FindString |
| --- |
| FindString(EMT, S$_1$...S$_j$)<br>  // Get the root node for the EMTree EMT.<br>  node = GetRootNode(EMT)<br>  // Start with first alt or packed char of root node.<br>  i = 1<br>  // Start at S$_1$.<br>  n = 1<br>  // Loop as long as S$_n$ is an alternate in the node and the |

FINDING A STRING - FindString

```
// node is not at the terminator.
loop while n < j AND FindAlternate(S_n, node, i) AND
               NOT IsTerminator(node, i)
    n = n + 1
    GoNextCharacter(node, i)
end loop
// Return TRUE if at the end of S and S_j is an alternate
// and the node is at the terminator.
return (node, i, (n = j AND FindAlternate (S_n, node, i)
               AND IsTerminator(node, i)))
end FindString
```

Deleting a String

The following pseudocode routine is used to delete a particular string from an EMTree, where the name of the EMTree is EMT and the string to delete is S. The routine starts first attempts to locate the string in the EMTree by a call the "FindString" routine, described above. If the string is not found, the routine terminates. If the string is found, a loop is executed that traces the string back, deleting any nodes that are specific only to the string. If the terminal node is an alt node with more than one alternate, the terminal alternate of the string is deleted. If the terminal node is a packed node or an alt node with only one alternate, the entire node is deleted. Then the loop repeats, operating on the node pointed to by the previous node pointer of the deleted node. After all nodes and alternates specific to the string are deleted, the routine terminates.

Any alt nodes that are reduced in size by deleting an alternate may be relocated in memory. This provides for more efficient memory usage. If a node is relocated, the previous node that points to it must have its next node pointer updated and any successor nodes pointed to by the relocated node must have their previous node pointers updated. The routine "NodeMayHaveMoved" provides these functions.

DELETING A STRING - DeleteString

```
DeleteString(EMT, S...)
    // First find the string and retrieve the node and I,
    // which are the last node for the string.
    node, i, found = FindString (EMT, S)
    done = NOT found
    loop while NOT done
        // If this is an alternate node with more than one alternate,
        // remove the one alternate and we are done. Since all previous
        // nodes point to multiple entries in the EMTree, we cannot
        // delete any more.
        if node.T = alternateType AND node.AK > 1 then
            loop while i <= node.AK
                node.AC_i = node.AC_{i+1}
                node.AT_i = node.AT_{i+1}
                node.AN_i = node.AN_{i+1}
                i = i+1
            end loop
            // Store the changed node. This may cause the node to be moved
            // since it has changed size by the removal of the one alternate.
            // Thus, we must inform all next nodes and the one back node of
            // the possible new node position.
            nodepointer = STORE_NODE(EMT, node)
            NodeMayHaveMoved(EMT, node, nodePointer)
            done = TRUE
        // In this case, the node is either a packed node or an alternate node
        // with only one alternate. In either case, the entire node is deleted.
        else
            // NOTE: If the node being freed is the root node, the tree is
            now
            // empty, which may imply some special conditions.
            if IsAtRootCharacter(node, 1)
```

DELETING A STRING - DeleteString

```
                FREE_NODE(EMT, node)
                done = TRUE
            else
                backNode, I = GoPreviousCharacter(node, 1)
                FREE_NODE(EMT, node)
                     node = backNode   // Set to continue the loop.
            end if
        end if
    end loop
end DeleteString
```

Retrieving a String

The following pseudocode routine is used to retrieve a particular string from an EMTree, where the name of the EMTree is EMT, terminal node is "node", and the location in node of the last character of the string is specified by 'i'. The routine executes a loop that traces the string back one character at a time via the previous node pointers, reading and buffering the characters that make up the string. If the current character is in a packed node and is not the last character of the packed node, the next character to store is merely the previous character of the packed node. If the current character is the first character of a packed node or is an alternate of an alt node, the previous node pointer is used to retrieve the previous node. If the previous node is a packed node, the next character to store is the last character of the packed node. If the previous node is an alt node, the previous character of the current node is used to determine the alternate for the string.

The loop executes until the root node is reached, at which time the entire string has been retrieved and the routine terminates.

RETRIEVING A STRING - RetrieveString

```
RetrieveString(EMT, node, i, S...)
    n = 1
    // Loop until the root node is reached.
    loop
        S_n = GetCurrentCharacter(node, i)
        n = n + 1
        // Get the node and I for the character just before the current
        // character. This may or may not mean going to the previous node.
        // If the current node is a packed node and i is beyond the first
        // packed character, just decrement i.
        if node.T = packedType AND i > 1
            i = i - 1
        // If not at root node, back up to the previous node.
        else if NOT isAtRootCharacter(node, i) then
            // Store the back character since we will need it later if previous
            // node is an alt node.
            backCharacter = node.BC
            // Read in the previous node using the back pointer.
            READ_NODE(EMT, node, node.BP)
            // Now make sure i is set correctly. If a packed node, go to
            // last packed character.
            if node.T = packedType
                i = node.PK
            // If an alt node, find the correct alternate.
            else
                FindAlternate(backCharacter, node, i)
            end if
        end if
    while NOT IsAtRootCharacter(node, i)
    // Reverse the string characters, putting the last character first and
    // the first character last.
    REVERSE_STRING(S, n-1)
    return (S)
end RetrieveString
```

What is claimed is:

1. In a computation means including processor means and memory means for executing digital programs, said programs including coded instructions and coded data, the improvement wherein:

(a) said processor means establishes in said memory means a tree of nodes that are interrelated by a distribution of pointers;

(b) said tree of nodes including predecessor nodes and successor nodes;

(c) said predecessor nodes and said successor nodes including packed nodes and alternate list nodes;

(d) said distribution of pointers including progressions of next node pointers in said packed nodes and alternate list node pointers in said alternate nodes;

(e) said processor means accessing progressions of said nodes in correspondence with progressions of items of said coded data;

(f) each of said progressions of nodes being associated with at least one identifier, wherein said identifier gives said progression of nodes the means to do at least one of (1) locating one or more other progressions of nodes within said tree of nodes, (2) being located by one or more other progressions of nodes from said tree of nodes, (3) locating one or more external objects, and (4) being located by one or more external objects;

(g) selected elements of different data items in selected progressions of successor nodes being different for different data items in order to uniquely identify said different data items; and (h) selected elements of different data items in selected predecessor nodes being common to said different data items in order to achieve a high concentration of said coded data in said memory means and to achieve rapid accessibility of said different data items by said processor means.

2. The computation means of claim 1 wherein the last element of each of said data items is in a unique position in said tree of nodes.

3. The computation means of claim 2 wherein said identifier is located in the node containing said last element.

4. The computation means of claim 1 wherein said distribution of pointers includes progressions of previous node pointers.

5. The computation means of claim 1 wherein each of said packed nodes includes a previous node pointer, a previous unit, a data element containing at least one data unit, and one of said next node pointers.

6. The computation means of claim 1 wherein each of said alternate list nodes includes a previous node pointer, a previous unit, and at least one alternate data unit, there being one of said alternate node pointers associated with each of said alternate data units.

7. In a computation means including processor means and memory means for executing digital programs, said programs including coded instructions and coded data, the improvement wherein:

(a) said processor means establishes in said memory means a tree of nodes that are interrelated by a distribution of pointers;

(b) said tree of nodes including predecessor nodes and successor nodes;

(c) said predecessor nodes and said successor nodes including packed nodes and alternate list nodes, each of said packed nodes including a previous node pointer, a previous unit, a data element containing at least one data unit, and one of said next node pointers, and each of said alternate list nodes including a previous node pointer, a previous unit, at least one alternate data unit, and an alternate node pointer associated with each of said alternate data units;

(d) said distribution of pointers including progressions of said next node pointers, said alternate node pointers, and said previous node pointers;

(e) said processor means accessing progressions of said nodes in correspondence with progressions of items of said coded data;

(f) the last element of each of said data items being in a unique position in said tree of nodes;

(g) each of said progressions of nodes being associated with at least one identifier located in the node containing said last element, wherein said identifier gives said progression of nodes the means to do at least one of (1) locating one or more other progressions of nodes within said tree of nodes, (2) being located by one or more other progressions of nodes from said tree of nodes, (3) locating one or more external objects, and (4) being located by one or more external objects;

(h) selected elements of different data items in selected progressions of successor nodes being different for different data items in order to uniquely identify said different data items; and (i) selected elements of different data items in selected predecessor nodes being common to said different data items in order to achieve a high concentration of said coded data in said memory means and to achieve rapid accessibility of said different data items by said processor means.

8. In a computation means including processor means and memory means for executing digital programs, said programs including coded instructions and coded data, the improvement wherein:

(a) said processor means establishes in said memory means plurality of trees of nodes that are interrelated by a plurality of distributions of pointers;

(b) each of said trees of nodes including predecessor nodes and successor nodes;

(c) said predecessor nodes and said successor nodes including packed nodes and alternate list nodes;

(d) said distribution of pointers including progressions of next node pointers in said packed nodes and alternate list node pointers in said alternate nodes;

(e) said processor means accessing progressions of said nodes in correspondence with progressions of items of said coded data;

(f) each of said progressions of nodes being associated with at least one identifier, wherein said identifier gives said progression of nodes the means to do at least one of (1) locating one or more other progressions of nodes within the same of said tree of nodes, (2) being located by one or more other progressions of nodes from within the same of said tree of nodes, (3) locating one or more other progressions of nodes within at least one other of said trees of nodes, (4) being located by one or more other progressions of nodes from at least one other of said trees of nodes, (5) locating one or more external objects, and (6) being located by one or more external objects; (g) selected elements of different data items in selected progressions of successor nodes being different for different data items in order to uniquely identify said different data items; and (h) selected elements of different data items in selected predecessor nodes being common to said different data items in order to achieve a high concentration of said coded data in said memory means and to achieve rapid accessibility of said different data items by said processor means.

9. The computation means of claim 8 wherein the last element of each of said data items is in a unique position in said tree of nodes.

10. The computation means of claim 9 wherein said identifier is located in the node containing said last element.

11. The computation means of claim 8 wherein said distribution of pointers includes progressions of previous node pointers.

12. The computation means of claim 8 wherein each of said packed nodes includes a previous node pointer, a previous unit, a data element containing at least one data unit, and one of said next node pointers.

13. The computation means of claim 8 wherein each of said alternate list nodes includes a previous node pointer, a previous unit, and at least one alternate data unit, there being one of said alternate node pointers associated with each of said alternate data units.

14. In a computation means including processor means and memory means for executing digital programs, said programs including coded instructions and coded data, the improvement wherein:

(a) said processor means establishes in said memory means plurality of trees of nodes that are interrelated by a plurality of distributions of pointers;

(b) each of said trees of nodes including predecessor nodes and successor nodes;

(c) said predecessor nodes and said successor nodes including packed nodes and alternate list nodes, each of said packed nodes including a previous node pointer, a previous unit, a data element containing at least one data unit, and one of said next node pointers, and each of said alternate list nodes including a previous node pointer, a previous unit, at least one alternate data element, and an alternate node pointer associated with each of said alternate data units;

(d) said distribution of pointers including progressions of said next node pointers, said alternate node pointers, and said previous node pointers;

(e) said processor means accessing progressions of said nodes in correspondence with progressions of items of said coded data;

(f) the last element of each of said data items being in a unique position in said tree of nodes;

(g) each of said progressions of nodes being associated with at least one identifier located in the node containing said last element, wherein said identifier gives said progression of nodes the means to do at least one of (1) locating one or more other progressions of nodes within the same of said tree of nodes, (2) being located by one or more other progressions of nodes from within the same of said tree of nodes, (3) locating one or more other progressions of nodes within at least one other of said trees of nodes, (4) being located by one or more other progressions of nodes from at least one other of said trees of nodes, (5) locating one or more external objects, and (6) being located by one or more external objects;

(h) selected elements of different data items in selected progressions of successor nodes being different for different data items in order to uniquely identify said different data items; and (i) selected elements of different data items in selected predecessor nodes being common to said different data items in order to achieve a high concentration of said coded data in said memory means and to achieve rapid accessibility of said different data items by said processor means.

* * * * *